(12) United States Patent
Grabelsky et al.

(10) Patent No.: US 8,509,225 B2
(45) Date of Patent: *Aug. 13, 2013

(54) IP-BASED ENHANCED EMERGENCY SERVICES USING INTELLIGENT CLIENT DEVICES

(75) Inventors: David Grabelsky, Skokie, IL (US); Michael Homeier, Lake Forest, IL (US); Anoop Tripathi, Lake Zurich, IL (US); Boby Joseph, Philadelphia, PA (US)

(73) Assignee: Hewlett-Packard Development Company, LP, Houston, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/178,911

(22) Filed: Jul. 8, 2011

(65) Prior Publication Data

US 2011/0267986 A1 Nov. 3, 2011

Related U.S. Application Data

(60) Division of application No. 12/204,837, filed on Sep. 5, 2008, now Pat. No. 8,027,333, which is a continuation of application No. 10/690,074, filed on Oct. 21, 2003, now Pat. No. 7,440,442.

(51) Int. Cl.
 *H04L 12/66* (2006.01)
 *H04L 12/28* (2006.01)
 *H04L 12/56* (2011.01)

(52) U.S. Cl.
 USPC ............... 370/352; 370/404; 379/37; 379/45; 455/404.1; 455/435.1

(58) Field of Classification Search
 USPC .......... 370/352–356, 395.31, 395.42, 395.52, 370/401, 409; 455/404.2, 432.3, 435.1, 404.1; 379/37, 45, 46, 49
 See application file for complete search history.

(56) References Cited

U.S. PATENT DOCUMENTS

| | | | |
|---|---|---|---|
| 5,937,344 | A | 8/1999 | Zicker |
| 6,223,046 | B1 | 4/2001 | Hamill-Keays et al. |
| 6,240,462 | B1 | 5/2001 | Agraharam et al. |
| 7,194,354 | B1 | 3/2007 | Oran et al. |
| 7,420,963 | B1 | 9/2008 | Shankar et al. |
| 7,627,091 | B2 | 12/2009 | Becker et al. |
| 7,756,253 | B2 | 7/2010 | Breen et al. |
| 7,826,598 | B1 | 11/2010 | Prozeniuk et al. |
| 7,944,909 | B2 * | 5/2011 | James ........................ 370/352 |
| 2002/0024943 | A1 | 2/2002 | Karaul et al. |
| 2002/0111159 | A1 | 8/2002 | Faccin et al. |

(Continued)

FOREIGN PATENT DOCUMENTS

WO 02/065791 8/2002

OTHER PUBLICATIONS

Schulzrinne, "Providing Emergency Call Services for SIP-based Internet Telephony," IETF Standard-Working-Draft, Internet Engineering Task Force, IETF, <http://tools.ietf.org/id/draft-schulzrinne-sip-911-00.txt> Jul. 13, 2000, DO. 1-13.

(Continued)

*Primary Examiner* — Binh Tieu

(57) ABSTRACT

Providing enhanced emergency services (E-911) to an IP Telephony-based PBX or similar system, by utilizing aspects of the intelligence of end-user SIP client devices to address challenges and difficulties associated with E-911-like services in LAN-based telephony environments.

19 Claims, 6 Drawing Sheets

(56) References Cited

U.S. PATENT DOCUMENTS

| | | | |
|---|---|---|---|
| 2003/0063714 A1 | 4/2003 | Stumer et al. | |
| 2004/0057425 A1 | 3/2004 | Brouwer et al. | |
| 2004/0160363 A1 | 8/2004 | Powers et al. | |
| 2004/0190497 A1 | 9/2004 | Knox | |
| 2005/0007999 A1* | 1/2005 | Becker et al. | 370/352 |
| 2005/0053209 A1 | 3/2005 | D'Evelyn et al. | |
| 2005/0083911 A1 | 4/2005 | Grabelsky et al. | |
| 2006/0120517 A1 | 6/2006 | Moon et al. | |
| 2006/0188073 A1 | 8/2006 | Wright | |
| 2008/0025489 A1* | 1/2008 | Dye et al. | 379/202.01 |
| 2008/0037715 A1 | 2/2008 | Prozeniuk et al. | |
| 2008/0162637 A1* | 7/2008 | Adamczyk et al. | 709/204 |
| 2008/0306872 A1* | 12/2008 | Felsher | 705/51 |
| 2009/0287837 A1* | 11/2009 | Felsher | 709/229 |
| 2010/0241595 A1* | 9/2010 | Felsher | 705/400 |
| 2011/0176541 A1* | 7/2011 | James | 370/352 |

OTHER PUBLICATIONS

Schulzrinne H., "Emergency Services for Internet Telephony based on the Session Initiation Protocol (SIP)" IETF Standard-Working-Draft, Internet Engineering Task Force, IETF. <http://tools.ietf.org/id/draft-schulzrinne-sipping-sos-04.txt> Jan. 8, 2003, pqs. 1-13.

Taylor, Tom, "SIP Emergency Assistance Scenarios" IETF Standard-Working-Draft, Internet Engineering Task Force, IETF, <http://tools.ietf.org/id/draft-taylor-sipping-emerg-scen-00.txt> Oct. 2003, pp. 1-22.

Schulzrinne Columbia U., "Providing Emergency Call Services for SIP-based Internet Telephony," IETF Standard-Working-Draft, Internet Engineering Task Force, IETF. <http://tools.ietf.org-draft-schulzrinne-sip-911-00.txt> Jul. 13, 2000 pp. 1-13.

* cited by examiner

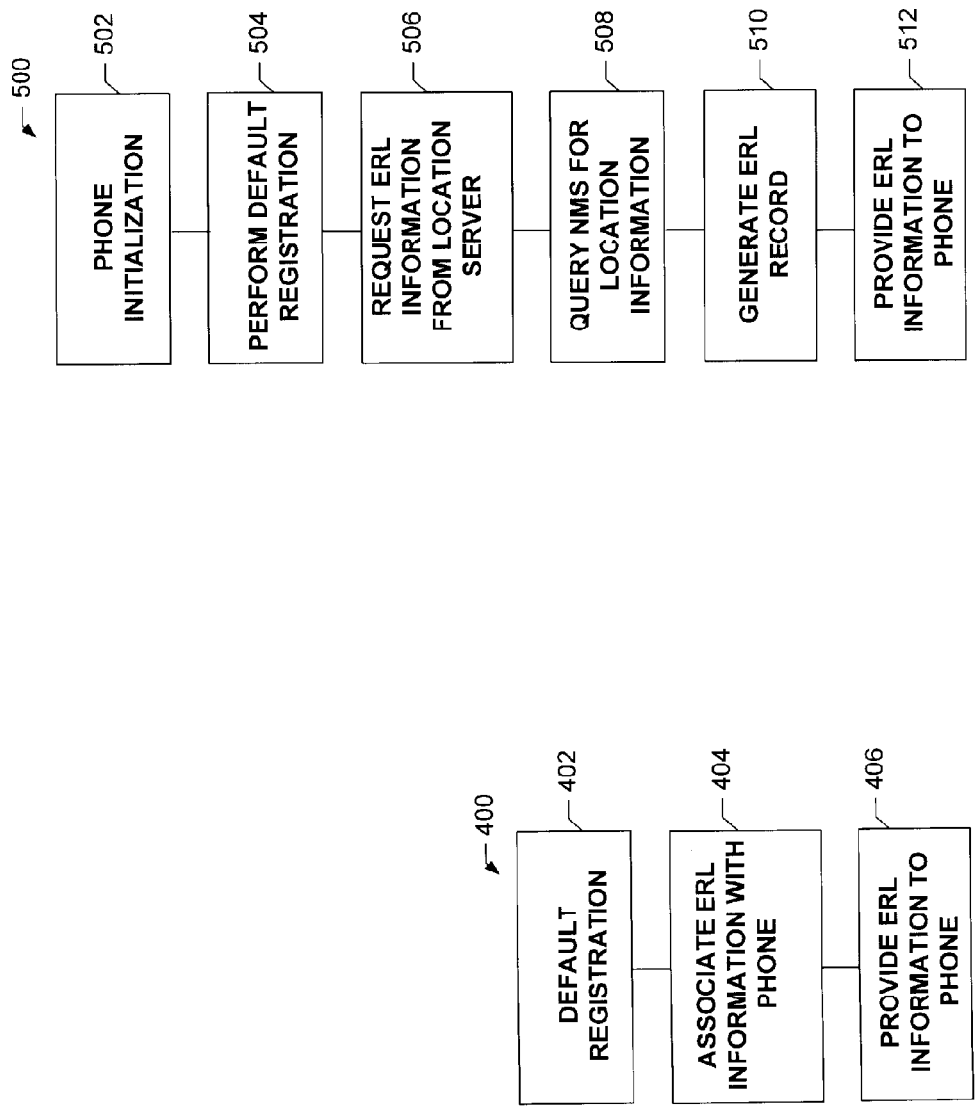

IP-BASED ENHANCED EMERGENCY SERVICES USING INTELLIGENT CLIENT DEVICES

CLAIM FOR PRIORITY

The present application is a Divisional Application of commonly assigned and U.S. patent application Ser. No. 12/204,837, filed on Sep. 5, 2008, now U.S. Pat. No. 8,027,333 which claims priority from and is a continuation of U.S. application Ser. No. 10/690,074, now U.S. Pat. No. 7,440,442, which was filed on Oct. 21, 2003, which are incorporated by reference herein in their entireties.

BACKGROUND

A. Field of Invention

The present invention is related to voice over IP communication systems, and more particularly, to a method and system of providing IP-based enhanced emergency services using intelligent client devices.

B. Description of Related Art

Enhanced emergency services for telephony systems tie the caller's physical location to the call signaling and follow-on messaging. The goal is to increase the effectiveness of the emergency response personnel. By helping pin-point the caller's location, as well as adding reliability to the telephony link between the caller and the emergency responder, precious time may be saved in responding to an emergency. In the United States, the service is referred to as E-911.

While government and industry groups have worked together to provide consistent requirements of the E-911 system, many aspects of practical implementations have not yet achieved standardization. The variety of systems currently deployed may share common elements in their respective designs, but optimal solutions are still lacking for many of the technical challenges posed by the requirements. This is particularly true for an IP telephony system in an enterprise or campus environment.

The successful delivery of E-911 service requires that two general areas of operation be satisfied: 1) the ability to route 911 calls to an appropriate emergency response center, based upon the location of the caller (calling station); and 2) the ability of the emergency response center to both locate, and automatically call back to, the calling station, following the receipt of a 911 call from that station (call-back being required, e.g., in the event that the original call gets disconnected). Both of these are related to each other by virtue of their dependency on the location of the calling station. Therefore, accurate and verifiable location of the caller is fundamental to proper implementation of E-911 service.

1. Emergency E911 Terminology

The definitions below reproduce E-911 terminology listed at the Association of Public-Safety Communication Officials (APCO) website. The list may be accessed at the following Internet website at www.apco911.org/about/pbx/index.html:

9-1-1: A three digit telephone number to facilitate the reporting of an emergency requiring response by a public safety agency.

9-1-1 Service Area: The geographic area that has been granted authority by a state or local governmental body to provide 9-1-1 service.

9-1-1 Service Provider: An entity providing one or more of the following 9-1-1 elements: network, CPE, or database service.

9-1-1 Tandem: (See E9-1-1 Control Office)

Access Line: The connection between a customer premises network interface and the Local Exchange Carrier that provides access to the Public Switched Telephone Network (PSTN).

Automatic Location Identification (ALI): The automatic display at the PSAP of the caller's telephone number, the address/location of the telephone and supplementary emergency services information.

Automatic Location Identification (ALI) Database: The set of ALI records residing on a computer system.

Automatic Number Identification (ANI): Telephone number associated with the access line from which a call originates.

Central Office (CO): The Local Exchange Carrier facility where access lines are connected to switching equipment for connection to the Public Switched Telephone Network.

Centralized Automated Message Accounting (CAMA): An MF signaling protocol originally designed for billing purposes, capable of transmitting a single telephone number.

Data Base Management System Provider: Entity providing Selective Routing (SR) and/or Automatic Location Identification (ALI) data services.

Data Provider: An entity which provides, on a routinely maintained static database, names, addresses and telephone number to be inserted and updated in the E911 MSAG. Data providers are defined as local exchange carriers, alternate exchange carriers, wireless carriers or an entity authorized to act on behalf of any of the aforementioned entities.

Default Routing: The capability to route a 9-1-1 call to a designated (default) PSAP when the incoming 9-1-1 call cannot be selectively routed due to an ANI failure or other cause.

Enhanced 9-1-1 (E9-1-1) Control Office: The Central Office that provides the tandem switching of 9-1-1 calls. It controls delivery of the voice call with ANI to the PSAP and provides Selective Routing, Speed Calling, Selective Transfer, Fixed Transfer, and certain maintenance functions for each PSAP. Also known as 9-1-1 Selective Routing Tandem or Selective Router.

Emergency Location Identification Number (ELIN): A valid North American Numbering Plan format telephone number assigned to the MLTS Operator by the appropriate authority that is used to route the call to a PSAP and is used to retrieve the ALI for the PSAP. The ELIN may be the same number as the ANI. The North American Numbering Plan number may in some cases not be a dialable number.

Emergency Response Location (ERL): A location to which a 9-1-1 emergency response team may be dispatched. The location should be specific enough to provide a reasonable opportunity for the emergency response team to quickly locate a caller anywhere within it.

Emergency Service Number (ESN): A number assigned to specific geographic area within which all E911 calls are routed to one specific PSAP and the residents of the area are served by the same police, fire, and emergency medical agencies.

Emergency Service Zone (ESZ): The geographic area within which all E911 calls are routed to one specific PSAP and the residents of the area are served by the same police, fire, and emergency medical agencies.

Fast Busy: (see Reorder Tone)

Grade of Service: The probability (P), expressed as a decimal fraction, of a telephone call being blocked. P.01 is the grade of service reflecting the probability that one call out of one hundred during the average busy hour will be blocked. P.01 is the minimum recommended Grade of Service for 9-1-1 trunk groups.

Master Street Address Guide (MSAG): A data base of street names and house number ranges within their associated communities defining Emergency Service Zones (ESZs) and their associated Emergency Service Numbers (ESNs) to enable proper routing of 9-1-1 calls.

No Record Found (NRF): A condition where no ALI information is available for display at the PSAP.

P.01 Grade of Service: (See Grade of Service.)

PBX: (See Private Switch)

Primary Public Safety Answering Point (PSAP): A PSAP to which 9-1-1 calls are routed directly from the 9-1-1 Control Office. (See PSAP)

Primary Rate Interface (PRI): Primary Rate Interface (PRI) is trunking technology which enables the networking of multiple locations. A single PRI trunk can carry various types of traffic. PRI provides such features as Calling Number Delivery, Called Number delivery, Network Redirection and Reason, Network Name, Network Ring Again, Network Automatic Call Distribution, Equal Access, Special number Services, Integrated Service Access (ISA), Network Message service, and Release Link Trunk (RLT). Each PRI trunk group requires one D-Channel and can support multiple DS-1s up to a maximum of 479 B-channels distributed over 20 DS-1 links. PRI call processing supports Q.931 messages for call setup, call progress, and feature activation.

Private Switch ALI (PS/ALI): A service option which provides Enhanced 9-1-1 features for telephone stations behind private switches. e.g. PBXs Public Safety Answering Point (PSAP): A facility equipped and staffed to receive 9-1-1 calls. A Primary PSAP receives the calls directly. If the call is relayed or transferred, the next receiving PSAP is designated a Secondary PSAP.

Public Switched Telephone Network (PSTN): The network of equipment, lines, and controls assembled to establish communication paths between calling and called parties in North America.

Reorder Tone: An audible tone of 120 interrupts per minute (ipm) returned to the calling party to indicate the call cannot be processed through the network. Sometimes referred to as fast busy.

SCC: The Qwest 9-1-1 database management service provider.

Selective Routing (SR): The routing of a 9-1-1 call to the proper PSAP based upon the location of the caller. Selective routing is controlled by the ESN which is derived from the customer location.

System Integrator: Coordination and oversight responsibilities as undertaken by the Company relating to the quality of 911 serviced provided by the Company, alternate exchange carriers and data providers.

2. E-911 Service Requirements

The primary elements of E-911 service are: 1) association of locations with 911 calls; and 2) routing 911 calls to emergency response centers most suited to answering and responding (including dispatching emergency personnel) to specific calls. The emergency response center is referred to as the Public Safety Answering Point, or PSAP. The mechanisms of E-911 service include transport of vital and relevant information in the call signaling, using this information to route the call to the optimal PSAP, and presenting this information to the PSAP personnel to help determine the location of the caller.

When a 911 call is placed, the location of the caller is used to route the call to an appropriate end-office switch. The calling station location is referred to as the Emergency Response Location, or ERL. The routing can be static, e.g., as in the case of a residential connection to a specific end-office; or dynamic, e.g., as in the case of a lookup by a PBX system based upon the calling station extension. Included in the call signaling is a phone number called the Emergency Location Identification Number, or ELIN, that identifies the ERL from which the call was placed. The ELIN is included in the call signaling of a 911 call as the ANI. In the PSTN, the ELIN is used to route the call to an appropriate PSAP. The routing is done by accessing a location information database called the called Automatic Location Identification (ALI) Database. The ELIN may also be used by the responding PSAP to access the ALI for detailed location information. The PSAP may also use the ELIN to call back the calling station in the event that the call gets disconnected.

In addition to the procedures used to set up a 911 call and determine the location of the caller, the system must insure that emergency calls cannot be disrupted by signaling events which might be allowable for non-emergency calls. For example, if the caller has call-waiting service, it must be disabled during an emergency call from that caller's phone. Similarly, only the PSAP, or its representative, may release a 911 call; if the caller hangs up the phone during a 911 call, the call should not be released. Other potentially interrupting service features must similarly be disabled. The PSTN typically provides these capabilities.

Typically in a PBX system, an on-site emergency facility will be notified when a 911 call is placed. This may be a simple logging system, or a security system that is monitored by security/safety personnel. The information available to such a system may include more detail than that passed to the PSTN, or maintained in the ALI database. For example, the location information available to the on-site system may be precise enough to identify an office or cubicle, while the ERL available to the PSAP may only identify a building floor or wing. Reliance on an on-site component to a PBX emergency response system is one approach to mitigating some of the difficulties in designing such a system.

Deployment of E-911 behind a PBX introduces further considerations such as location precision, mapping ELIN to calling station, and the information in the ALI database. As noted, the specification of the location of a 911 calling station is defined as the Emergency Response Location, or ERL. The precision with which the ERL actually locates a calling station may vary. For example, for residential service, an ERL may be the address of a house, or a unit within an apartment complex. For an enterprise PBX, an ERL could be a building address, a floor in building, a wing on a floor, or even an office or cubical.

When an ERL corresponds to an extended area, such as building floor or wing, it may contain multiple calling stations. Note that the information used both to route a 911 call to a PSAP, as well as to provide the PSAP with the location of the calling station, is only as precise as the ERL from which the call is placed. Considerations in specifying an ERL can include state and local regulations governing required precision of the location, and, in the case of multi-station ERLs, the maximum number of calling stations that a single ERL may contain. Recall that the identity of an ERL is associated with the ELIN, which acts as a phone number. Note that one ERL may possess more than one ELIN, but one ELIN may identify one and only one ERL.

Within the PSTN, location information is maintained in a database called the Automatic Location Identification (ALI) Database. Typically, there are multiple ALI databases, each associated with, e.g., a different calling area, or different local exchange carrier (LEC). The ALI database essentially correlates ELINs with ERLs, as well as with routing rules for directing 911 calls to appropriate PSAPs. Thus the ALI database is queried using the ELIN when a 911 call is made to determine which one of possibly multiple PSAPs should receive the call. Once the call is received by the PSAP, the ELIN may again be used to query the ALI, this time to provide ERL information. The ELIN can also be used by the PSAP as a direct call back number to the calling station, e.g., in the event that the original call is disconnected. That is, as far as the PSAP is concerned, the ELIN functions as a Direct Inward Dial (DID) number to the calling station. Note that in the case of multi-station ERLs, a single ELIN may be shared among all calling stations in an ERL. Therefore, in order for the PSAP to be able to use the ELIN as a DID number to refer to a specific calling station, some form of mapping from ELIN to calling station must be implemented by the PBX.

When a 911 call is placed from behind a PBX, the ERL of the calling station is the factor that determines the ELIN that will be passed to the end-office switch; i.e., into the PSTN signaling space. Before the call is actually passed to the PSTN, the PBX, or some associated on-site emergency service system, must first select an appropriate end-office switch. If there is only one choice (i.e., the PBX is connected to only one switch), then the decision is pre-determined. If there is more than one, then the on-site system must be configured to route 911 calls to end-office switches based upon ELIN (or ERL). When the switch receives the call, it (or an agent of the switch) consults the ALI database to determine the proper PSAP to which the call should be routed.

Once the PSAP receives the call, the location and callback information it gets is only as specific as is contained in the ELIN and the ALI database. That is, any site-specific mapping or location information that is not contained in the ERL definition in the ALI database is not passed in the call. Typically, calls outbound from a PBX do not pass internal extension information. This means that if an ERL contains several calling stations, the ALI will only locate the ERL, not individual calling stations. Also, even if each calling station has its own DID number, the PSAP will only receive the ELIN of the ERL; the on-site emergency system must incorporate intelligence to recognize that a 911 call has been made, and, if multi-station ERLs are used, to establish and maintain a mapping of ELIN to DID of the calling station (to support the event of call disconnection to the PSAP). Depending upon the level to which internal location information is passed in outbound 911 calls, a PBX may actually have to multiplex callback numbers across internal location areas, rather than provide location-unique information to emergency response centers. To complicate matters further, the allowable size and definition of such internal areas may be subject to different regulatory rules in different states or localities.

Unless each calling station is its own ERL, then sharing of ELINs among calling stations leads to the possibility of more than one concurrent 911 call using a single ELIN. While the ERL information in such a case would be correct, the callback information would be ambiguous, since the PSAP would have no way of uniquely identifying the calling station beyond ELIN, and thus the PBX would not be able to de-multiplex a callback from the PSAP based upon ELIN alone. Note that while the ALI database must be regularly updated to reflect configuration changes in the PBX system, such updates are not intended to provide dynamic mapping on a call-by-call basis.

One way to deal with the case of multiple calls per ERL is to assign multiple ELINs to multi-station ERLs. Such a technique is used in the Emergency Response E-911 system by Cisco, for example. The number of ELINs per ERL can be determined according to the statistical probability of concurrent 911 calls in an ERL of a given size. As long as the number of ELINs assigned to an ERL is always greater than or equal to the number of concurrent 911 calls from that ERL, then there can always be a unique mapping of ELIN to calling station. One limitation is that "always" can not be guaranteed except for the case of single-station ERLs. Given multi-station ERLs, the issue of the number of ELINs provisioned for each ERL is primarily one of cost: the PSTN service provider charges for each ELIN assigned. Thus for multi-station ERLs, there is a tradeoff between a "safe" ratio of calling stations to ELINs, and the cost of ELINs. The importance or relevance of this tradeoff is partially dependent upon the size and type of PBX.

For example, in a traditional (TDM) PBX system that provides each calling station with a DID number, single-station ERLs are not necessarily an excessive allocation of circuit resources. Since the service provider charges for each DID number, the PBX can, in principle, use each DID as an individual ELIN, thereby providing each calling station with its own ERL (and ELIN). This can work because, in a circuit-based PBX, even though each DID is typically associated with a person (e.g., employees at an enterprise), each is also assigned to a specific calling station. Because a 911 call is tied to the ERL of the calling station, the DID number identifies the ERL.

The situation is different in an IP-based PBX that uses, e.g., SIP. In this case, even if each person served by the PBX has an individual DID number, that number is not necessarily tied to a specific calling station (i.e., SIP phone). Rather, each DID number is associated with a person, and any person could register at any SIP phone behind the PBX. As a result, no predictable association exists between personal DID numbers and ERLs. It is still possible to tie each calling station to an ERL by virtue of some hardware attribute and assign an ELIN to the ERL. However, in order to support single-station ERLs in this environment, a complete second set of hardware-identifying DID numbers would be required to assign one each to every calling station. While this would free personal DIDs to travel with each user, it could be expensive, and requires a burdensome level of provisioning of circuit resources.

In addition to the problems associated with the ELIN-DID mapping in multi-station ERLs in IP-based PBXs, LAN system and equipment configurations tend to be more fluid, in general, than circuit-based PBX systems. Layer 2/3 switches can be moved or reconfigured, IP subnets can be modified, and SIP phones can be relocated. Within the context of E-911 service, this characteristic has the potential of translating into problems or difficulties in maintaining accurate location information, even for calling stations. Some solutions, such as the Cisco Emergency Responder, utilize a centralized device (e.g., the Emergency Responder node) to query a network device (e.g., the CallManager) to obtain a list of registered phones. The central device then queries individual switches to determine which physical ports are associated with those phones. Because a user's location may change at any moment, the central device must repeat this process continuously. If the time between queries is short, the amount of network traffic can become large, and if the time interval is too long, the risk of improperly reporting the ERL increases.

A LAN-based or VoIP-based PBX can introduce additional problems because internal extension numbers, which are usually associated with a person, may not be accurate indicators of location. For example, in the case of a SIP-based system, a given end user with a "fixed" phone number may actually register at arbitrary locations within network. If such a user makes a 911 call, then the fixed phone number associated with that user may provide inaccurate, or worse, dangerously erroneous, location information. To address this problem, a 911 caller's phone number must be mapped to a physical attribute of the phone, such as MAC address, which in turn may be associated with a current network location.

While conceptually straightforward, this solution brings with it added complexities, such as a new layer of indirection in the mapping, possible delay issues, and the need for a method for reliable location tracking of "portable" phones, among others.

In addition, reliance on network-based call control elements in setup of 911 calls can introduce a failure point. While redundant elements may be added, this increases the expense and configuration of the E911 system. It also requires call control elements to reside on the same site as the phones in order to avoid WAN-based communications to complete a 911 call. In turn, this may add further expense for small sites that could otherwise use WAN-based communications for non-emergency calls. Consequently, a system that overcomes these limitations is desirable.

SUMMARY

Described herein is a method of providing enhanced emergency services (E-911) to an IP Telephony-based PBX or similar system, by utilizing aspects of the intelligence of end-user SIP client devices to address challenges and difficulties associated with E-911-like services in LAN-based telephony environments.

The system and methods limit, or preferably eliminate, direct reliance on the IP Call Processing network element (e.g., SIP Proxy) during actual emergency calls. The system and method preferably incorporates processing capabilities of intelligent IP phones. In one embodiment, information necessary for initiating 911 calls is stored in the phone. The information may include an ERL identifier, or one or more ELINs for identifying the source of the 911 call to the PSAP.

Thus, one aspect of the preferred embodiments is to provide ERL information to an intelligent phone, thereby enabling it to place emergency calls directly to a PSTN gateway, without involvement or aid of any other call signaling components. This also enables network configurations in which the call signaling component may be resident at a site remote from the intelligent phones, without the danger of a failed inter-site link causing an inability in placing an emergency call.

In one preferred embodiment, the IP phone communicates directly to a PSTN gateway, bypassing any signaling agents typically used to set up a call. In an alternative embodiment, the call is initiated by communicating with call signaling elements, such as a SIP Proxy device. In either embodiment, the method preferably includes providing the phone with ERL information (in the form of one or more ELINs) to provide to the gateway or call signaling element. Further aspects of preferred embodiments include providing the phone with a default gateway identifier, thereby allowing the phone to identify a default PSTN gateway to use for 911 calls when bypassing the normal signaling elements. The ERL, ELIN and/or default gateway identifier information may be provided during the phone's boot-up procedure, or using subsequent signaling messages.

A location server preferably stores the ERL and associated ELINs, as well as default gateway identifier information. In addition, the location server preferably stores location information associated with the IP phone. A further aspect of preferred method is the use of an intelligent PSTN gateway that is capable of receiving and acting upon IP-based call setup signaling directly from IP phones, as well as implementing some ancillary functions associated with 911 calls.

There are numerous network management tools and systems that can auto-detect network topology and operational state. An element of E-911 service in an IP-based PBX, then, is interfacing to, or integration of, the appropriate network management functions that ensure accurate and reliable location information.

An additional feature of certain preferred embodiments includes automatic discovery of intelligent phone location when the phone registers with the system. This may involve the merger of the network management system with the signaling system to be able to find device. The preferred embodiments include a Location Server as the architectural element of the network that bridges the call signaling components and the network management components. The location server, based on the MAC address of a calling device or an IP address assigned to a calling device, is able to determine a physical port associated with the device. The determination may be made through a network management system.

In another aspect of certain preferred embodiments, the intelligent phone enters into a state of emergency readiness before presenting dial tone, and without the need for a specific user to register in the network via the phone. This may support, e.g., public phones, at which no user is registered, but from which calls, in particular emergency calls, may be placed.

Still further aspects include certain actions by the intelligent phone for ensuring that emergency calls cannot be disrupted by otherwise normal call signaling events to the phone. These include sending a notification to the network signaling agent (e.g., SIP Proxy) informing it that an emergency call has been placed; or de-registering the user from the phone (via SIP signaling to the Proxy), so that the IP network will not even try to place calls to the phone.

Additional aspects include actions by the intelligent phone for ensuring that emergency calls cannot be released by the caller once the call has been connected to the PSAP. These include declining to generate and/or send the appropriate IP-based signaling message(s) that would initiate the call release sequence. In addition or instead, the phone could automatically activate its speaker and/or microphone if and when the caller attempts to release a connected emergency call. This feature may be easily extended to systems utilizing video phone features or capabilities to provide a monitoring function.

Yet another feature of the system is a PSTN gateway that is configured to accept direct signaling from intelligent phones in the case of emergency calls. That is, the preferred gateway includes a SIP stack to accept an invite from something other than a SIP proxy. In certain embodiments, the gateway stores ERL and associated lists of ELINs for use in initiating an outgoing 911 call. The preferred PSTN gateway is also configurable to provide priority handling to emergency calls. In addition, the gateway preferably maintains a record of in-use ELINs, performs ELIN management, generates CDRs associated with emergency calls, sends a notification to the safety/security station when the call is placed, and provides backup storage of intelligent phones' ERL information.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein:

FIG. 4 illustrates a preferred method of configuring a phone for emergency state readiness;

FIG. 5 illustrates an alternative preferred method of configuring a phone for emergency state readiness;

DETAILED DESCRIPTION OF EXEMPLARY EMBODIMENTS

A. Reference Architecture

Figure 1:
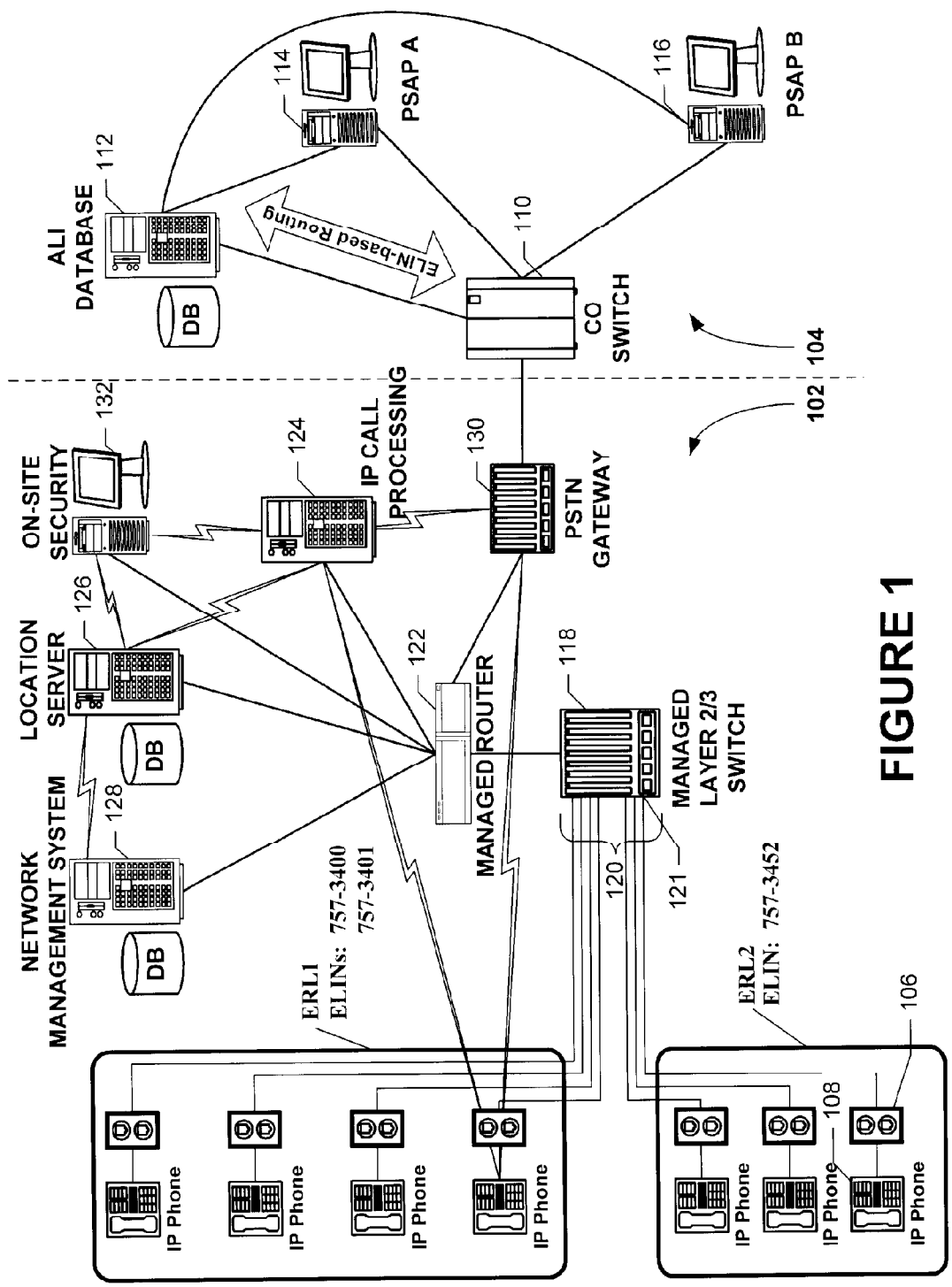
FIG. 1 is a block diagram illustrating one embodiment of a high-level reference architecture.

The basic components of IP-based E-911 service are illustrated in FIG. 1, which depicts a high-level reference architecture of a preferred embodiment. The elements are shown to reside either behind the IP PBX (Enterprise Premise area 102) or in the PSTN space (Service Provider & PSAPs area 104). Multi-station emergency response locations ERL1 and ERL2 reside in the enterprise area 102. ERL1 may be associated with a description of the Emergency Response Location, for example, of 3200 Main Street, $3^{rd}$ floor, and ERL2 may be associated with a description of 3200 Main Street, $2^{nd}$ floor, cubes 5 through 7. Note that ERL1 has two ELINs, while ERL2 has just one.

The physical connection points to the network are preferably provided by some form of jack (e.g., an RJ45) which are identified with physical locations. An example physical location is jack 106, indicated for the bottom-most connection point in FIG. 1, which might be an RJ-45 jack located on the second floor, cubicle 7. Other types of connection hardware and networking may be used, such as token ring, optical fiber, and wireless ports (e.g., 802.11, Bluetooth, etc.). In FIG. 1, an IP phone (e.g., phone 108) is connected to each managed physical connection point 106, which is connected to a single managed port 121. The phones may use the Session Initiation Protocol (SIP), for example, but other types of IP-based phones may also be used. The phones may be dedicated programmable hardware, or soft-clients running on, e.g., desktop computers.

The PSTN side 104 includes a Central Office (CO) switch 110, an ALI database 112, and two PSAPs 114, 116. There may be more or fewer of each of these components. Note that the enterprise side 102 may actually be distributed over multiple sites or campuses. In such an embodiment, it is assumed that some form of secure managed links is maintained between individual sites. As examples, VPN connections over IPsec, or private leased lines may be used.

Managed Layer 2/3 switch 118 is the managed switch that provides the first point of connectivity to the network for the IP phones (and other IP client devices). As illustrated, ports 120 on the switch 118 are connected directly to the managed physical connection points, such as port 106. The switch 118 is typically resident at the same site as the phones (and other devices), which use it to connect to the local IP network. Note that there may be other switches at topologically higher levels in the network.

The managed router 122 represents the managed network infrastructure above the managed switch 118. That is, there may be a multiplicity of routers and related devices (e.g., DHCP servers, AAA servers, etc.). From the point of view of determining the location of IP phones, only the managed switch 118 is relevant. Thus, only a single representative router 122 is shown in FIG. 1. In embodiments having multiples sites, each site may have one or more routers.

An IP Call Processing network element 124 is responsible for IP-based signaling and call control. For example, in a SIP-base system, this may be a SIP Proxy server. The Call Processing element 124 may be located at the same site as the phones that it services, or may be located remotely at a different (possibly central) site. If remotely located, the relevant signal messaging will traverse the inter-site connections (e.g., secure VPNs).

The Location Server 126 is a network element that keeps track of where phones are located, maintaining the information in a database. This element may be located at the same site as the phones, or remotely, at a different (possibly central) site. If remote, the relevant communications with other network elements may traverse the inter-site connections (e.g., secure VPNs).

Network management system (NMS) 128 is a combination of hardware and software that monitors and manages the network. In the context of E-911 services, the NMS 128 should be capable of discovering the location of any IP phone, as specified by the managed switch 118 and switch port 120 to which the phone connects. The NMS 128 may be located at the same site as the phones, or remotely, at a different (possibly central) site. If remote, the relevant communications with other network elements may traverse the inter-site connections (e.g., secure VPNs).

The PSTN gateway 130 provides an interface to the CO switch 110 (e.g., via PRI lines) on the PSTN side, and IP connectivity (e.g., via RTP) on the IP network side. The gateway 130 may interact with the IP Call Processing element 124 in order to manage calls, but may also be able to communicate directly with intelligent IP phones for this purpose. The gateway element 130 is typically on the same site as the phones that it services, since it is preferably connected to the local PSTN. However, it could be at a remote site, but preferably is able to place PSTN calls to the appropriate PSAP for the phones that it services. In addition, it is desirable for the gateway 130 to be able to establish and maintain reliable IP connectivity to those phones across the inter-site IP links.

The On-site Security Station 132 is a monitoring station at which security/safety personnel may obtain real-time status and information on emergency calls placed to a PSAP. It must be on the same site as the phones that it services. That is, it is intended to support on-site personnel in responding to local (same site) emergency calls.

In FIG. 1, all of the above elements are shown to have physical connections (solid lines) to the network (represented by the Managed Router 122). Logical links, shown as zig-zag lines, indicate which elements communicate with each other in the implementation of E-911 services. Only a single, representative phone 108 is shown to have such links; it should be understood that all phones may have similar logical links. Note that not all possible communications links are shown, and that others are possible. Finally, there may be other elements of a local data and IP telephony network which are not shown in FIG. 1. These may include other application servers, multimedia servers, etc. It should be understood that their omission from FIG. 1 does not exclude their possible presence in a network that supports E-911 services.

B. Exemplary Method for Emergency Telephony Services

In the following descriptions of preferred embodiments, the IP telephony network is assumed to be based upon SIP, and SIP messaging is used to illustrate the system and method. However, other protocols that support direct signaling and call control messaging between the IP phones and the PSTN gateway are also possible (e.g., H.323). First the functional architecture is presented, followed by a description of system initialization, and finally actual call processing. In addition, some configuration and provisioning considerations are discussed.

1. Functional Architecture

Figure 2:
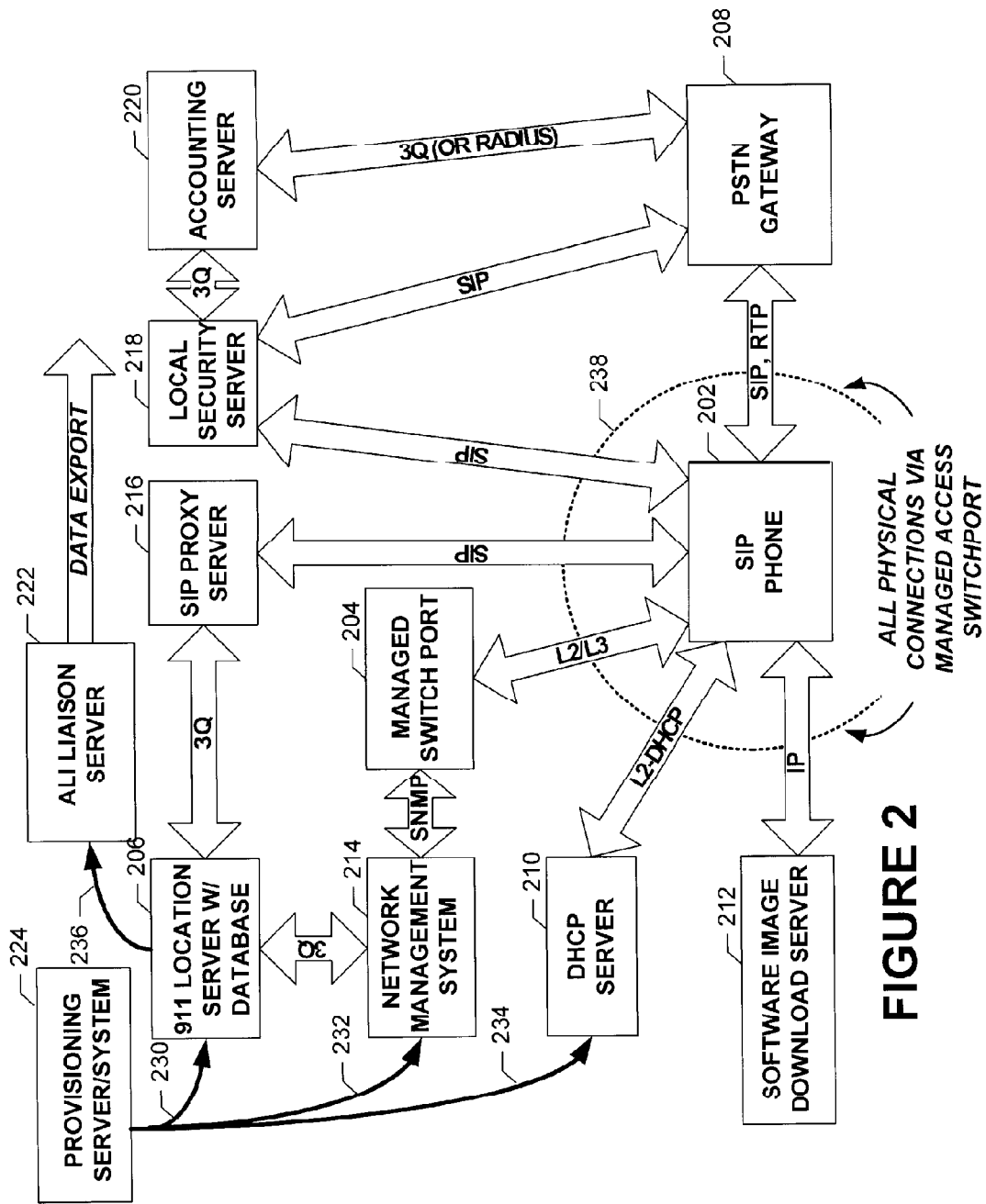
FIG. 2 illustrates the functional elements of E-911 service in one preferred embodiment.

FIG. 2 illustrates the functional elements of E-911 service in a preferred system, as well as the architectural relationships among them. The elements include a SIP phone 202, Managed Access Switch Port 204, 911 Location Server and Database 206, PSTN Gateway 208, DHCP Server 210, Software Image Download Server 212, NMS 214, SIP Proxy Server 216, Local Security Station 218, Accounting Server 220, ALI Liaison Server 222, and Provisioning Server 224.

SIP phone 202 is the calling station from which 911 calls may be placed. It includes processing intelligence; i.e., a SIP user agent for support of the SIP protocol, plus additional application capabilities for features, functions and services, including speaker mode. Phone 202 uses DHCP to obtain an IP address, and may also obtain other custom options via DHCP. Custom options may be used, for example, to identify the Software Image Download server, or a default SIP Proxy server. The SIP phone does not necessarily support SNMP. However, phone 202 does support the 911-specific functionality associated with this system and method.

The Managed Access Switch Port 204 typically identifies the first layer 2/3 switch and switch port within the managed network infrastructure to which the SIP phone connects for access to the local IP network. This typically does not include any layer 2 devices that may possibly be deployed between the phone and the first managed switch; e.g., a desktop switch which is not part of the managed infrastructure. The managed switch preferably supports SNMP, or an alternative network management protocol.

Figure 3:
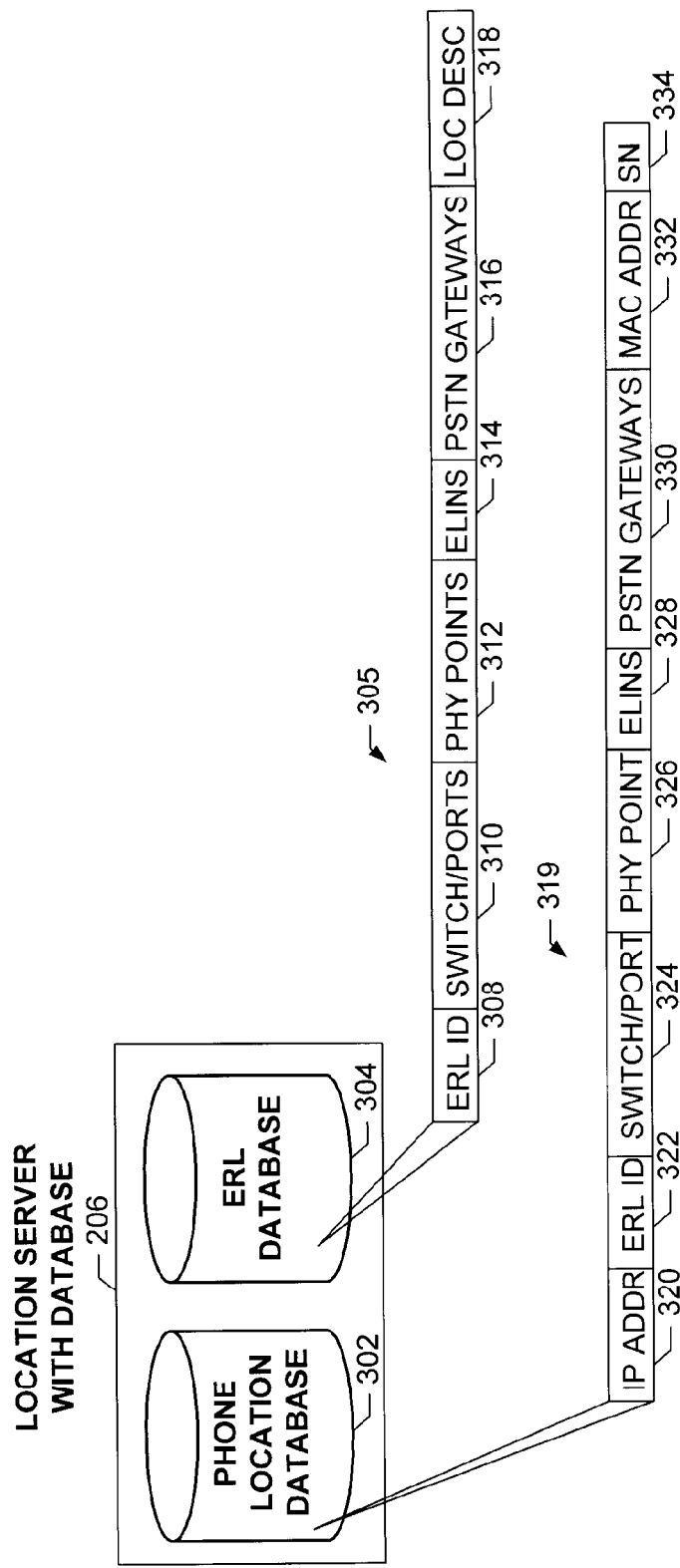
FIG. 3 illustrates a preferred embodiment of a location server and database.

The 911 Location Server Database 206 is a centralized server that preferably maintains two databases: an ERL database 302, and a Phone Location database 304, as shown in FIG. 3. The ERL database typically stores one record 305 for each ERL in the campus or site served by the emergency system. Each ERL record 305 preferably contains the following information: ERL identification 308; Assigned managed switch and switch ports 310; Assigned managed physical connection points 312; Assigned ELINs 314; Assigned PSTN gateways 316; and Location Description 318. Alternative ERL records may contain a subset of these parameters, and may also include others not listed here.

The composite information in an ERL record 305 defines the ERL. ERL definitions are created first "on paper" as part of a site management process that may or may not lend itself to automation. That is, the assignments of switch ports, ELINs, etc., to an ERL may depend upon the physical layout of the site, and hence require human decision making The ERL records in the database may be populated as part of a provisioning/configuration process.

The Phone Location database 304 stores one record 319 for each registered phone in the system. Each phone location record 319 preferably contains the following information: IP address 320 of the phone; Assigned ERL 322 (ERL identification); Assigned managed switch and switch port 324; Assigned managed physical connection point 326 (only if port-to-connection point is one-to-one); Assigned ELINs 328; Assigned PSTN gateways 330; MAC address 332 of the phone; and Serial Number 334 of the phone. Additional information may also be contained in the phone location record.

Note that an ERL record 305 may contain multiple switch ports 310 and multiple physical connection points 312, while a phone location record 319 contains only a single switch port 324 and single physical connection point 326. That is, an ERL serves one or more possible switch ports 120, while a phone 202, 108 is served by one of each of these entities (i.e., one physical connection point, and one switch port). In contrast, each phone may be served by all of the ELINs and PSTN gateways assigned to its ERL. Note also that, if a single switch port is connected to multiple managed connection points (e.g., several cubes sharing access to a switch port), then it is not possible to determine the connection point from a phone's IP address. In such cases, its physical connection point may be omitted from the Phone Location record. However, typical LAN configurations do use one-to-one assignments of switch ports to physical connection points. In these cases, the switch port is equivalent to the physical connection point, provided the mapping information is maintained.

The process for populating the Phone Location database is dynamic, executing in response to a request to the 911 Location server from the SIP Proxy server 216. Given an initial request from SIP Proxy server 216 with the IP address or MAC address of a SIP phone, the 911 Location Server 206 discovers the Managed Access Switch port 204 for the phone, and uses the switch port identification 324 to index the associated ERL record. A new Phone Location record 319 is then created, and the associated information loaded. Subsequent requests from the SIP Proxy Server 216 using the same IP address or MAC address may cause the Phone Location record 319 to be retrieved, or a new location discovery process to be launched. A new discovery process may result in updated location information, which may be used to update the Phone Location record 319.

It should be understood that the descriptions of these databases are illustrative, and they may be implemented in multiple ways. The description herein is one of many ways. For example, alternative embodiments may use less information and fewer data fields, or there may be additional information in additional data fields included in these databases. In addition, the 911 Location Server databases 302, 304 may serve phones that are co-resident at the same site, or resident at a site remote from the server.

The PSTN gateway 208 provides PSTN connectivity to the packet-based phone system. For a given SIP phone, this is the specific media gateway, or set of media gateways, from among a possible plurality of media gateways available to the phone, that provides access to the PSTN for 911 calls. The Gateway 208 terminates SIP calls from, and originates SIP calls to, the SIP phones that it serves. It also supports additional SIP functionality for communication with the Local Security Server 218. If multiple PSTN gateways are available, each SIP phone may be assigned a prioritized list for backup/reliability purposes. In addition, the PSTN gateway 208 supports some ancillary tasks associate with 911 calls, including maintaining a record of ELINs that are in use, and maintaining minimal call-state information specific to active 911 calls.

The DHCP Server 210 provides IP client devices such as SIP phone 108 with IP addresses and other parameters when they first start up, and upon subsequent request. DHCP server 210 responds to the SIP phone's initial DHCP request for IP access in the local network. In addition to an IP address, the DHCP response message may include custom options, such as identification of a Software Image Download Server 212.

The Software Image Download Server 212 provides each SIP phone with its software image when it initializes, or boots up, through the use of a download request message and a download response. Note that other methods of supplying the SIP phone with its software image are possible, such as nonvolatile ROM or RAM storage in the phone. Such alternative methods may eliminate the need for the Software Image Download server 212.

The Network Management System (NMS) 214 is a combination of hardware and software that monitors and manages the network. It may reside in a remote or central site, but can still perform basic network management functions, such as device discovery, and topology mapping in the local network. In particular, the Network Management System 214 may discover the Managed Access Switch port 204, given the IP address or MAC address of a connected SIP phone. It may also be used to discover if any unmanaged switches are in the path between the SIP phone and the Managed Access Switch port. In a preferred embodiment it uses the SNMP protocol to communicate with the various network components.

The SIP Proxy Server 216 is the IP Call Processing network element 124 in a SIP-based system. SIP Proxy Server 216 may reside in a remote or central site.

The Local Security Station Sever 218 is the monitoring station in an on-site system that may be monitored by security/safety personnel. This station provides alerts when 911 calls are placed, and supplies additional location information that may not be available in the ERL definition in the ALI database. For example, the switch port to which the SIP phone is connected may be used to identify a specific location, such as an office or cubicle. It may also provide web-based user interface.

The Accounting Server 220 is a repository of records related to calls that have been made in the system. Accounting Server 220 is a sever suitable for maintaining call detail records, as well as associated management functions, such as reading, writing, and updating records. In particular, it maintains call detail records associated with emergency calls.

The ALI Liaison Server 222 is an application that converts the system's ERL information, in particular Location Description 318, into a format compatible with the ALI database maintained by the LEC or service provider. The ALI liaison is configurable to adapt to multiple ALI database formats used by LECs and service providers.

The Provisioning Server 224 is a server that allows network managers and operations personnel to create/update provisioned data and parameters of the system such as user accounts and authorizations. In the context of E-911 service, it can be used to manually populate the ERL database in the 911 Location server.

Note that some of these elements, such as the SIP Proxy Server 216, the PSTN Gateway 208, and the Accounting Server 220, may be common to other functions of an IP telephony system, besides E-911 service. In addition, some elements used in the operation of an IP telephony system, but not specifically in E-911 service, may be omitted from the figure for clarity. Interfaces between elements are represented by specific protocols, identified in the double arrows connecting the elements. The interface identified simply as "IP" supports standard IP communications, without reference to specific high-layer protocols. Similarly, the arrow labeled "L2/L3" represents the basic, low-layer support of all upper-layer protocols. Note that "3Q" is a 3Com protocol which is similar to RADIUS. Thus, RADIUS or other suitable protocols (e.g., DIAMETER) may be used in alternative embodiments. The arrows 230, 232, 234, 236, represent information flow through an API or interactive user interface. All of the protocols in this illustration are exemplary, and alternative suitable protocols may be used.

In FIG. 2, the dotted circle 238 surrounding the SIP phone 202 identifies all the protocol interfaces that are supported by the phone's physical connection to the Managed Access Switch port 204. The switch port 204 itself is included explicitly because it provides the most precise physical location for the phone 202 that is known to the overall system, and therefore performs a functional role in enabling E-911 service. Note that the management of the switch port 204 by the Network Management System 214 is also explicitly shown (via SNMP in this illustration). For all the other indicated protocol interfaces, the switch port 204 provides the usual network access, and thus is omitted from the communication paths depicted in FIG. 2 for clarity.

2. System Configuration

When an IP telephony system is deployed at an enterprise or campus, each ERL is preferably defined in terms of the Managed Access Switch ports and physical connection points that will be included. The process of mapping the topology of these switch ports may be an automated feature of the Network Management System, but the task of assigning individual switch ports and connection points to specific ERLs requires human decision making The task of assigning an ELIN or ELINs to each ERL is similarly discretionary.

Assignment of the PSTN gateway or gateways may be determined in part by requirements of the LEC, but may also include some discretion on the part of the site management. The considerations that go into making the assignments may include state and/or local regulation, as well as preferences of the site management personnel.

Once the configuration is defined, it is provisioned in the 911 Location Server database 206. Each Managed Access Switch port 204 is included in an ERL record 305, which preferably contains the information shown in FIG. 3, and discussed above. Again, other information may be added to the ERL record 305. For example, when a SIP phone 108 registers, it becomes associated with an ERL, by virtue of the phone's physical connection point 106 and switch port 121. The ERL record may be dynamically extended to include the IP and/or MAC addresses of all associated and/or registered SIP phones. Other ancillary information may also be included in the record, such as, phone extension numbers, cube numbers, names of employees assigned to the locations (areas, offices, cubes, etc.), text or image-based descriptions of the location, and any other relevant information (including file names or URL or other links to additional information) that may be useful in assisting emergency response teams.

Any time the network configuration is modified, the provisioning information associated with the ERL records is preferably updated. Modifications include, but are not limited to, adding/removing switch ports to/from an existing ERL, adding/removing ERLs, and modifying network switch interconnections or topologies. As described below, the system also includes periodic self-consistency checks in order to detect any such modifications for which the provisioning updates were not made, or were made incorrectly.

3. SIP Phone Initialization and Default Registration

The method 400 of SIP phone initialization and default registration shown in FIG. 4 illustrates how a SIP phone first achieves a state of emergency services readiness (that is, a state in which any arbitrary end user may use the phone to place a 911 call). This may be an appropriate state for a public phone; no actual user registration would be required. The steps outlined below describe a preferred embodiment of the system and method, and it should be understood that alternative implementations may be used to achieve the desired results. Some of the possible alternatives are noted as well, but these are not intended to represent the full range of implementation approaches.

In a preferred method 400, the phone first registers (step 402) with the system using a configuration associated with a default profile. The system then determines (step 404) the ERL information associated with the phone based on the phone's location, and at least a subset of the ERL information is then provided (step 406) to the phone. The ERL information provided to the phone preferably includes one or more ELINs that may be used when the phone initiates an emergency 911 call.

In an alternative embodiment shown in FIG. 5, a preferred method 500 operates as follows: when a SIP phone (e.g., phone 202) is first connected to the Managed Access Switch port 204 and powered on, it is initialized, as shown at step 502. Initialization involves booting the phone 202 with its operational software and generally registering on the network, by, e.g., obtaining an IP address. Preferably, the phone will issue a DHCP request to initially obtain its IP address. Assuming the phone 202 acquires its software image from a download server 212, the DHCP response may also contain the address of this server in an option data field of the message. Similarly, the address of the SIP Proxy server 216 may be included in a DHCP option field. If a download server 212 is not used, then the associated option may be omitted; the address of the SIP Proxy 216 may be determined in another manner, such as pre-configuring the information in the phone 202.

In one preferred embodiment of step 502, the phone 202 will next request its software image from the download server 212. After download, the phone will boot the image and again contact the DHCP server 210 to renew/reinitialize its lease, and possibly request a new IP address on a specific subnet. This second DHCP request may be omitted from step 502 if the phone's software resides locally on the phone 202 in RAM or ROM memory.

At step 504, the phone 202 performs default registration. Typically the phone 202 will issue a SIP REGISTER message to its SIP Proxy server 216 in order to obtain a default registration; this message may also contain information about the phone hardware if it is relevant to the SIP Proxy's actions. Note that this request is not associated with any specific end user, but with the phone itself. Upon receipt of the SIP registration request, the SIP Proxy server 216 will access a default profile for the phone, either from a local cache, or an external profile server. The profile may contain such information as keypad mapping, allowed functions, etc., for default operation of the phone.

At step 506, the relevant ERL information is obtained. Preferably, SIP Proxy 216 will issue a request to the 911 Location Server 206 for the ERL information for the SIP phone 202, passing the phone's IP and/or MAC address as its identifier. In some embodiments, the location server does not populate or dynamically update its database of phone identification records 319 until a query is received. In such embodiments, the initial request for this phone may result in the absence of a record 319 for this IP and/or MAC address. Thus, at step 508, the 911 Location Server will use the phone's IP and/or MAC address in a request to the Network Management system for the identity of the Managed Access Switch port to which the phone is connected. Step 508 may be omitted in embodiments where the phone location record is updated via other means, typically associated with the phone registration (for example, in response to a DHCP request or DHCP response, or software image download, etc.). In further alternative embodiments, the database information may be co-located or merged with the SIP proxy function.

The Network Management system 214 may also be able to determine if there are any intervening, unmanaged switches between the phone and the managed switch port. The Network Management system 214 will provide the switch port identification in its response (or in its dynamic update) to the 911 Location server 206, along with the identity of any intervening, unmanaged switches. If there are any unmanaged switches in the path between the phone and the managed switch port, then the 911 Location server 206 may choose to deny admission of the phone into the system. Such an action would prevent potentially bogus location information from being entered into the database. The action may also be accompanied by an alert to the NMS 214, or similar monitoring function, allowing for corrective action to be taken. If the phone 202 is connected directly to the managed switch port 204, then the 911 Location server 206 uses the switch port identification to lookup the associated ERL record in step 510, and at least a subset of the information in the record is returned to the SIP Proxy. Preferably, the ERL information provided to the SIP Proxy includes a list of ELINS for the ERL. Alternative embodiments may include other information such as text description of the location, cube or office number, occupant(s), etc. A Phone Location record 319 is also created (or updated) for the phone, and entered into the Phone Location database.

When the SIP Proxy receives the ERL information, it sends at least a subset of it to the SIP phone at step 512. The subset includes one or more ELINs for use in a subsequent emergency 911 call. The ERL information is preferably sent in the OK message, along with the phone's default profile, to complete the registration transaction. The SIP phone activates its default profile, and internally stores its ERL information for use in the event that a 911 call is placed. Once the default registration is successful the SIP phone may receive dial-tone, indicating that it has achieved the state of emergency services readiness. Note that any subsequent, user-specific registrations will not invalidate the ERL information received by the phone during default registration. For example, a specific user may register with a personal profile at the phone without affecting the default registration state or default profile of the phone.

Figure 6:
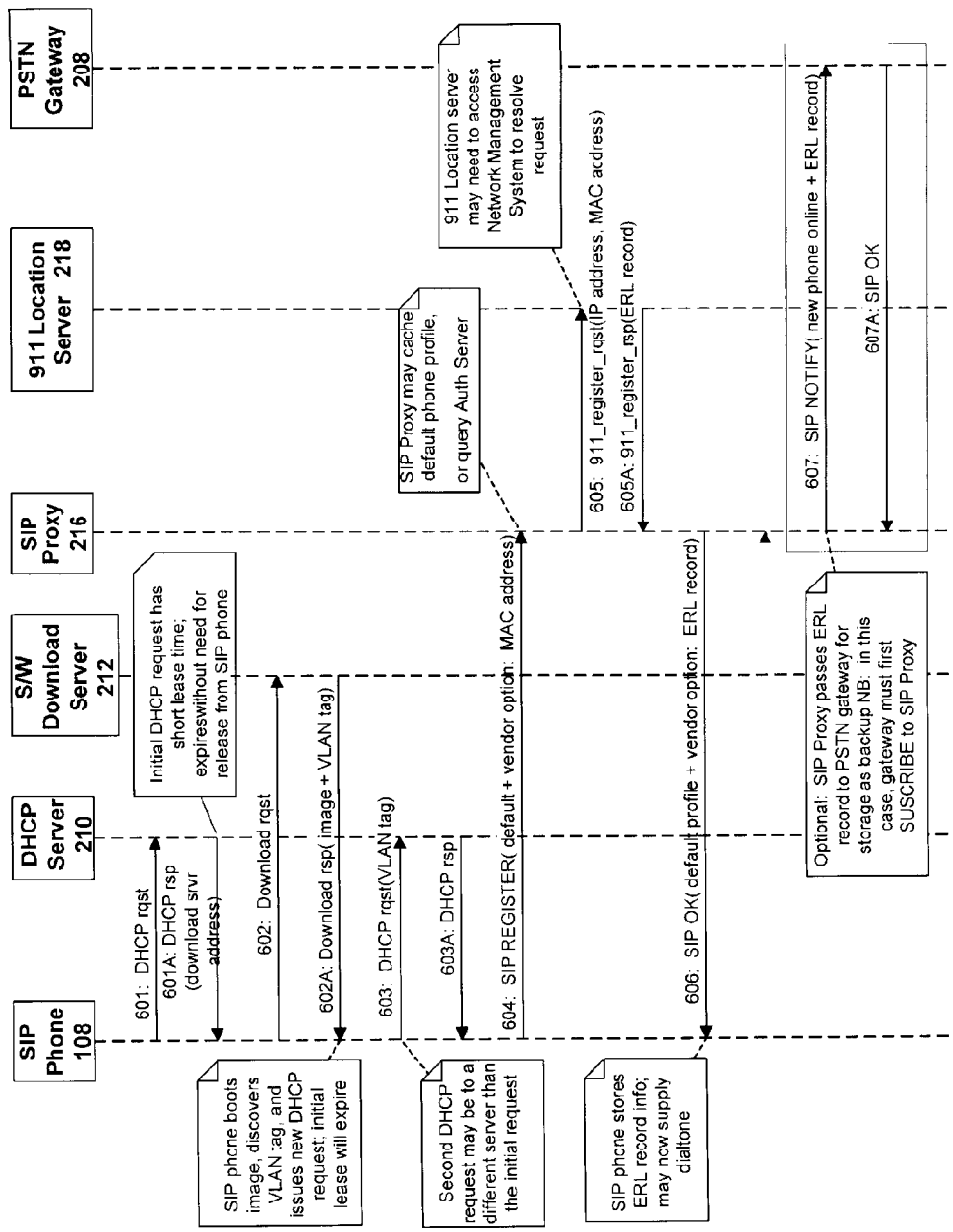
FIG. 6 is a call signaling flowchart for phone initiation.

FIG. 6 is a call flow showing the initialization procedure. In this example, the SIP phone sends a DHCP request (step 601) to obtain an initial IP address (step 601A). Then phone 108 sends a download request for a boot image (step 602). The phone receives a software image (step 602A), and a VLAN tag, and issues a second DHCP request using the VLAN tag (step 603). The phone may then register with the network (step 604), which in this case uses SIP signaling and a SIP proxy. The SIP proxy queries the location server (step 605), and upon receiving the response, sends the SIP OK message containing the ERL record along with the default profile (step 606), preferably as a textual description in the body of the SIP OK message.

FIG. 6 thus illustrates how voice traffic may be kept on a specific VLAN within a local IP network. In addition, an optional action (step 607) is shown in which the PSTN gateway provides local backup storage of the phones ERL information. It should be understood that the exact steps, as well as their sequence, are illustrative, and alternative call flows may be used.

4. 911 Call Processing

Figure 7:
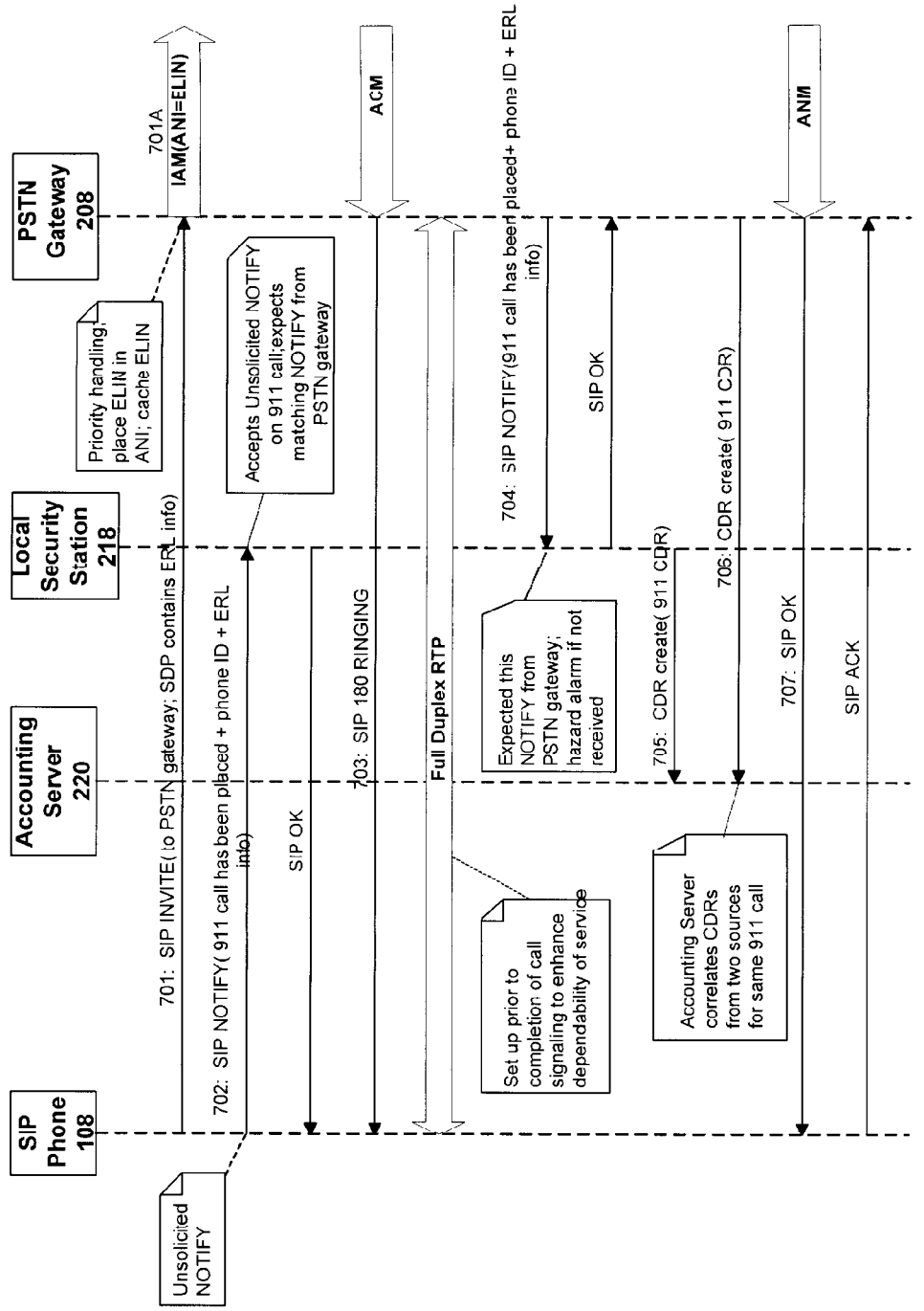
FIG. 7 is a call signaling flowchart for establishing a 911 emergency call.

With reference to FIG. 7, when a 911 call is placed from a registered SIP phone 108 (default or user-specific registration), the SIP phone 108 user agent application will retrieve the stored ERL information and formulate a SIP INVITE message 701 containing the ERL information for transmission to the PSTN gateway 208. The ERL information may be included in an associated SDP, but other methods of inclusion of the ERL data in the INVITE message 701 are possible. In one embodiment, the INVITE message 701 is sent directly to the PSTN gateway 208; i.e., it is not directed to the SIP Proxy 216. The phone 108 then sends a SIP NOTIFY directly to the Local Security station 218.

Upon receiving the SIP INVITE message 701, the PSTN gateway 208 places an outbound call 701A on the appropriate PSTN interface. The PSTN signaling in this example is based on SS7/ISUP, but other signaling could be used, for example PRI. Note that PSTN signaling elements for handling SS7/ISUP are not shown in FIG. 7. The call may be to the local CO switch, which will direct the call to a 911 tandem switch for processing. Alternatively, the PSTN gateway 208 may have a specific interface for 911 calls. Either way, the gateway 208 will examine the Service Description Protocol (SDP) message (or other appropriate message elements) in the INVITE message 701 in order to determine the ERL. The SDP preferably includes the ERL record 305, or may include only an associated ERL ID 308, or one or more assigned ELINs from the list of ELINs 314. It will then examine the list of (possibly multiple) ELINs, and select one that does not match any that may already be included in its list of in-use ELINs. The selected ELIN is used to set the ANI in the outbound call 701A. The ELIN will then be recorded (possibly along with other ELINs), effectively marking it as in-use for any subsequent 911 calls from the same ERL. Along with the ELIN, the list may also contain additional identifying information about the location of the calling station; for example, the phone's IP address and the ERL identifier.

Once the call is placed to the PSTN, the gateway 208 will send a SIP NOTIFY message 704 to the Local Security station 218 with the status of the call. The gateway 208 will also generate CDRs (Call Detail Records) at various stages of each 911 call episode, and send them (706) to the Accounting Server 220; for example, when the call is placed to the PSTN, when the call terminates, etc.

For the duration of the call, the PSTN gateway 208 must be able to map any inbound call from the PSAP to the assigned ELIN to the original calling station. However, the gateway 208 must block any other calls inbound to the assigned ELIN.

The Local Security station 218 preferably includes an application that correlates SIP NOTIFYs 702 for 911 calls from SIP phones with SIP NOTIFYs 704 from the PSTN gateway 208. This will help insure reliability of the system, since the security station can be made to expect a notification from the gateway 208 that the call has been placed. If such notification is not received, the security station can be alerted, and the monitoring personnel can take appropriate backup action. In a duplicate action with the gateway 208, the Local Security station will also generate CDRs 705 at various stages of each 911 call episode, and send them to the Accounting Server 220.

The Accounting Server 220 will correlate and merge CDRs on each 911 call. They will be available for viewing and analysis at a later time, as well as documenting the call.

Once the call has been handled and terminated normally (i.e., the emergency situation is known to have been handled and cleared by the PSAP), call teardown proceeds as usual. When complete, the call status is cleared from all the relevant database elements, and the list of in-use ELINs at the PSTN gateway 208 is cleared of the associated call entry. If a particular call is terminated, but there is no clear indication that the emergency situation has been resolved, then the in-use status of the associated ELIN is maintained, as is the list at the gateway 208. After a configurable time limit, if no further information is received regarding the call, it is assumed to be resolved, and the ELIN is freed up and the list is cleared of that entry. All call status changes during the call, including termination, will cause the gateway to issue SIP NOTIFY messages to the Local Security station. In addition, some or all of the same status changes will cause the gateway 208 to generate related CDRs to the Accounting Server 220.

While a 911 call is active, the assigned ELIN is marked as in-use, by virtue of its presence in the PSTN gateway's 208 list. Any subsequent 911 calls from the same ERL while the ELIN is in use should be assigned a different ELIN for that ERL. For example, the gateway 208 may compare the list of ELINs in a SIP INVITE with the list of ELINs in its list to make this determination. However, depending upon the number or ELINs per ERL, there could arise a circumstance in which a 911 call is made from an ERL when all ELINs for that ERL are active (in-use). In this case, the PSTN gateway 208 preferably employs an algorithm to select which of the in-use ELINs for the particular ERL should be re-assigned to the new 911 call. For example, the ELIN which has been in-use for the longest time could be assigned to the new call. Note that this will invalidate the previous mapping of the ELIN to the original calling station 108. However, the relevant call information, even if it includes a multiply-assigned ELIN, can be maintained at the gateway 208 and/or the security stations for the duration of the calls.

Note that once a call is established from a calling station 108 to a PSAP, it must not be disrupted by otherwise normal call signaling events. For example, the calling station 108 should not receive any call-waiting messages, or other advanced calling feature signals. This can be achieved with the SIP phone 108 simply by having the phone 108 use only its default profile once a 911 call is placed from it, and signaling the SIP Proxy 216 to block any inbound signaling to the phone 108. Alternatively, if there is an active personal registration (and personal profile) at a SIP phone 108 when a 911 call is placed, the phone 108 may automatically de-register that user from the phone 108. This has the effect of blocking any signaling to the user at that specific phone 108, since the SIP Proxy 216 would no longer see the user as reachable at the phone 108. Note that calls to that user could still be placed to any other SIP user agents at which he/she is registered. Again, there may be other ways to accomplish the non-disruption feature.

The phone's user agent application may also ensure that, once connected to the PSAP, the call cannot be released by the caller. For example, once a 911 call is active, the user agent application can simply decline to send a SIP BYE message if the user hangs up the phone 108. In addition or instead, the phone 108 may automatically activate its speaker and/or microphone if the user hangs up. This way, the PSAP could maintain a monitor at the phone's location, even if the user does not participate further in the call. Such a mode of operation could be advantageous, for example, in an intrusion situation.

Location Verification Management

Location verification management includes the methods, processes, and triggers used to discover location information for each calling station and ERL; populate the information elements of the location server database; and periodically check and verify the validity of database information, perform any required updates, and generate any alarms or alerts. These are covered in following subsections.

1. Network Topology Considerations

One challenge in devising a location management strategy is that network topologies can differ from LAN to LAN, and enterprise to enterprise. In the context of location determination of a specific IP client device (with one physical interface) in a wireline network, an important piece of information is the location of the first managed switch that provides the (layer 2/3) entry point into the network. Here, the term "first" refers to the phone's perspective, looking toward the network. The term "managed" refers to a switch that is maintained as part of the managed infrastructure of a local network, e.g., by an enterprise's IT department. It is used to distinguish from an unmanaged switch, such as a desktop switch that may be connected to the network, but deployed outside the boundary of the managed infrastructure. Note that an unmanaged switch may still be discoverable by the network management system of the managed infrastructure, but critical attributes such as location might not be available or reliable.

The switch port on the first managed switch provides the most specific location information available, with respect to the managed infrastructure. The infrastructure may be configured to provide a unique switch port to individual locations, such as offices or cubicles. In this case, the identity of the managed switch port also specifies the location of the managed physical connection point. Alternatively, the configuration could be set up to provide area-wide, shared access to all or some of the managed switch ports, for example, by locating managed hubs between the shared switch ports and available connection points distributed across several offices or cubicles. In this case, the identity of the managed switch port specifies only the area served, but cannot distinguish between individual connection points. The precision of the location in the former case would likely be greater than that in the latter case (though not necessarily).

If the first managed switch port is also the first port to which a client device is connected (i.e., there are no unmanaged switches in between), then it provides the most specific location information for that client, with respect to the managed infrastructure, and with a precision corresponding to the sharing configuration of the port. For example, if a managed switch port serves a single office, then a client device connected to that port would be known to be connected in the corresponding office. Note that this does not preclude the possibility of using a very long Ethernet cable for the connection, thereby effectively decreasing the precision of the location information. If instead, a managed switch port serves a cluster of cubicles, then a client device connected to that switch port would be known to be connected in one of cubicles in the cluster. Again, non-switched extensions (e.g., hubs) could decrease the effective precision of the location information.

If a client device is connected to the first managed switch port via an unmanaged switch (e.g., an intervening desktop switch), then the precision of the location of the client with respect to the managed infrastructure is effectively decreased, in a similar manner to a non-switched extension. However, there are two potential differences: 1) the network management system 214 may be able to detect the presence of the unmanaged switch; and 2) such a switch could provide unmanaged bridging of multiple subnets, which could be problematic from the point of view of client location determination (particularly if the client device has more than one physical interface). As is discussed in the next subsection, management of switch ports may include the ability to discover unmanaged switches, and detect if they introduce any problematic topologies.

2. Switch Port Management

Switch port management refers to establishing and maintaining identifying information about the managed switch ports that are configured for first-port access for client devices. This information should be sufficient to specify the location of a connected client, at least to the precision supported by the port-sharing configuration.

When a network is set up, a new switch installed, or an existing switch relocated, this information must be updated. Assuming that the network management system 214 can discover the network topology, any updates to the location information must be validated against the port-to-port and/or switch-to-switch connections determined by the topology. This is discussed in the previous section under "System Configuration."

Switch port management also includes discovery of unmanaged switches, if possible. While location information for such devices may not be reliable, their presence in the path between client devices and managed switches may be detectable. Further, any unmanaged switch that provides bridging between managed switch ports or between IP subnets must be flagged, if the bridging topology can be discovered. If such an unmanaged switch is determined to be the first switch port connection for an IP calling station (SIP phone), then an alert can be generated to the network management system 214, allowing appropriate action to be taken according to local policy.

The identifying information in a switch configured to provide first switch port access could include: the IP address of the switch; the Port number on the switch; the Switch location; the most precise location associated with port number (e.g., office, cubicle, cluster, floor, etc.); managed physical connection points assigned to the switch port.

3. Automatic Discovery

Automatic discovery encompasses three processes:
1. Discovery of network topology, including managed and unmanaged switches (if possible);
2. Discovery of calling stations (SIP phones); and
3. Generation and population of the Location Server database.

The first process is generally a capability provided by the network management system 214. Suitable network management tools and features are available on platforms such as HP Openview, available from Hewlett Packard. Alternatively, new software layers (e.g., middleware) may be used to provide this service to the Location server via an API, or similar programmable interface. The software preferably utilizes the SNMP protocol to obtain routing tables from routers and bridging tables from switches to identify an IP address with a known port and physical location.

Processes (2) and (3) preferably run on the Location server. They access the interface to the network management system 214 as needed. For each calling station, the second process combines the switch port identification information with any location information that may be supplied by the calling station, in order to determine the most accurate location of the calling station, as well as its ERL. It is possible for the result this process to indicate an inconsistency in the one or more of the reported configurations. For example, if the physical mapping of switch ports to physical connections is modified, but the change is not properly updated in the provisioning system, then the NMS discovery could disagree with the recorded mappings. If the change is made while registered SIP phones are connected to the switch, then the phones' internally stored location information will disagree with that reported from an NMS discovery procedure.

The respective weightings given to the phone location information and the switch port location information depends upon the trigger that invokes the discovery process. For example, if a SIP registration is the trigger, then the switch port information is taken as correct. However, if periodic verification check is the trigger, and the phone has maintained continuous registration, then the phone location may be selected over that of the switch port (assuming disagreement).

The third process uses input from the second process to generate the Location Server database records.

4. Triggers and Actions

Triggers are the events that cause the automatic discovery processes to run. Actions are additional tasks and/or functions that are associated with processes. The trigger for process (1) is a request for information from either of the other two processes. That is, when either process of (2) or (3) executes, they invoke process (1) in order to get the required input. It is up to process (1) to decide how to carry out the request. For example, whether restricted or full topology discovery is required to fulfill the request; or whether current topology information is applicable to a request, without actually running any discovery steps.

The triggers for process (2) are: SIP phone registration; Periodic, automatic verification check.

The triggers for process (3) are: System turn-up; SIP phone registration; Periodic, automatic verification check.

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. An apparatus for communicating over a packet based network, said apparatus comprising:
   logic to send a request for communication services in the packet based network, to receive a registration response from the packet based network that includes an emergency response location (ERL) record, said ERL record being associated with the ERL of the apparatus, and to transmit at least a portion of the ERL record as part of an emergency call setup process; and
   a processor to implement the logic.

2. The apparatus of claim 1, wherein the ERL record includes one or more emergency location identification numbers (ELINs), and wherein the logic is to transmit at least one of the ELINs.

3. The apparatus of claim 1, wherein the packet based network is an Internet Protocol network.

4. The apparatus of claim 1, wherein the logic is to use the Session Initiation Protocol.

5. The apparatus of claim 1, wherein the ERL record includes one or more ELINs, and wherein the logic is to transmit at least one of the ELINs in a session description protocol (SDP) contained in a SIP INVITE message.

6. The apparatus of claim 1, wherein the logic is to transmit at least a portion of the ERL record to a public switched telephone network (PSTN) gateway device, wherein the logic is to select the PSTN gateway device according information in the ERL record, wherein the at least a portion of the ERL record comprises an ERL ID, and wherein the PSTN gateway device is to insert a corresponding ELIN into the caller identification portion of an outgoing 911 call.

7. The apparatus of claim 1, wherein the logic is to transmit at least a portion of the ERL record to a PSTN gateway device, wherein the at least a portion of the ERL record comprises one or more ELINs, and wherein the PSTN gateway device is to insert one of the ELINs into the caller identification portion of an outgoing 911 call.

8. The apparatus of claim 1, wherein the logic is to transmit at least a portion of the ERL record to a call signaling device, wherein the logic is to select the call signaling device, wherein the at least a portion of the ERL record comprises an ERL ID, and wherein the signaling device is to transmit a request to a PSTN gateway device to make an outgoing 911 call using an ELIN inserted into a caller identification portion of the outgoing call.

9. The apparatus of claim 1, wherein the logic is to transmit at least a portion of the ERL record to a call signaling device, wherein the at least a portion of the ERL record comprises one or more ELINs, wherein the signaling device is to select an ELIN, and wherein the signaling device is to transmit a request to a PSTN gateway to make an outgoing 911 call using an ELIN inserted into the caller identification portion of the outgoing call.

10. The apparatus of claim 1, wherein the apparatus comprises an internet protocol (IP) address and wherein the ERL of the apparatus is based in part on the IP address of the apparatus.

11. The apparatus of claim 1, wherein the apparatus comprises a media access control (MAC) address and wherein the ERL of the apparatus is based in part on the MAC address of the apparatus.

12. The apparatus of claim 1, wherein the apparatus comprises a serial number, and wherein the ERL of the apparatus is based in part on the serial number of the apparatus.

13. The apparatus of claim 1, wherein the logic is further to transmit an address of a PSTN gateway device for use during an emergency call.

14. An apparatus for communicating over a packet based network, said apparatus comprising:
   logic to receive a request from a device to register for communication services in the packet based network, to determine an emergency response location (ERL) of the device, and to transmit to the device a registration response that includes a corresponding ERL record, said ERL record including parameters enabling the device to initiate an emergency 911 call; and
   a processor to implement the logic.

15. The apparatus of claim 14, wherein the logic is to use SIP to transmit the registration response that includes the ERL record.

16. The apparatus of claim 14, wherein the request to register for communication services comprises a SIP REGISTER message, and the registration response that includes the ERL record is a SIP OK message, issued in response to the SIP REGISTER message from the packet based phone to a SIP network.

17. The apparatus of claim 14, wherein the logic is to determine the ERL of the device based on at least one of an IP address, a MAC address, and a serial number of the device.

18. A non-transitory computer readable storage medium on which is embedded a computer program, said computer program implementing a method of configuring an apparatus for initiating an emergency call in a packet based network, said computer program comprising a set of instructions to:
   responsive to sending a request from the apparatus to register for communication services in the packet based network, receive at the apparatus a registration response from the packet based network that includes an emergency response location (ERL) record, said ERL record being associated with the ERL of the apparatus; and
   transmit from the apparatus at least a portion of the ERL record as part of an emergency call setup process.

19. A non-transitory computer readable storage medium on which is embedded a computer program, said computer program implementing a method of configuring an apparatus for initiating an emergency call in a packet based network, said computer program comprising a set of instructions to:
- responsive to receiving a request from the apparatus to register for communication services in the packet based network, determine an emergency response location (ERL) of the apparatus; and
- transmit to the apparatus a registration response that includes a corresponding ERL record, said ERL record including parameters enabling the apparatus to initiate an emergency 911 call.

* * * * *